(12) United States Patent
Tang et al.

(10) Patent No.: US 7,675,192 B2
(45) Date of Patent: Mar. 9, 2010

(54) ACTIVE DC BUS FILTER FOR FUEL CELL APPLICATIONS

(75) Inventors: David Tang, Fontana, CA (US); Silva Hiti, Redondo Beach, CA (US); Constantin C. Stancu, Anaheim, CA (US); Gregory S. Smith, Woodland Hills, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 682 days.

(21) Appl. No.: 11/153,171

(22) Filed: Jun. 15, 2005

(65) Prior Publication Data

US 2006/0284487 A1   Dec. 21, 2006

(51) Int. Cl.
*B60L 1/00*      (2006.01)
*B60L 3/00*      (2006.01)
*H02G 3/00*      (2006.01)

(52) U.S. Cl. ..................................... 307/10.1

(58) Field of Classification Search ............... 307/1, 307/9.1, 10.1
See application file for complete search history.

(56) References Cited

U.S. PATENT DOCUMENTS

| | | | | |
|---|---|---|---|---|
| 5,629,592 | A * | 5/1997 | Henmi | 318/107 |
| 5,929,692 | A * | 7/1999 | Carsten | 327/531 |
| 6,362,585 | B1 * | 3/2002 | Hiti et al. | 318/430 |
| 2002/0109406 | A1 * | 8/2002 | Aberle et al. | 307/10.1 |

* cited by examiner

*Primary Examiner*—Albert W Paladini
*Assistant Examiner*—Carlos Amaya

(57) ABSTRACT

A control system for a vehicle powered by a fuel cell includes a voltage conversion device that communicates with the fuel cell through a voltage bus and a propulsion system that is selectively powered by the fuel cell through the voltage bus and that selectively generates a ripple current in the voltage bus. The voltage conversion device is regulated to selectively generate a counter-ripple current that reduces the ripple current.

26 Claims, 5 Drawing Sheets

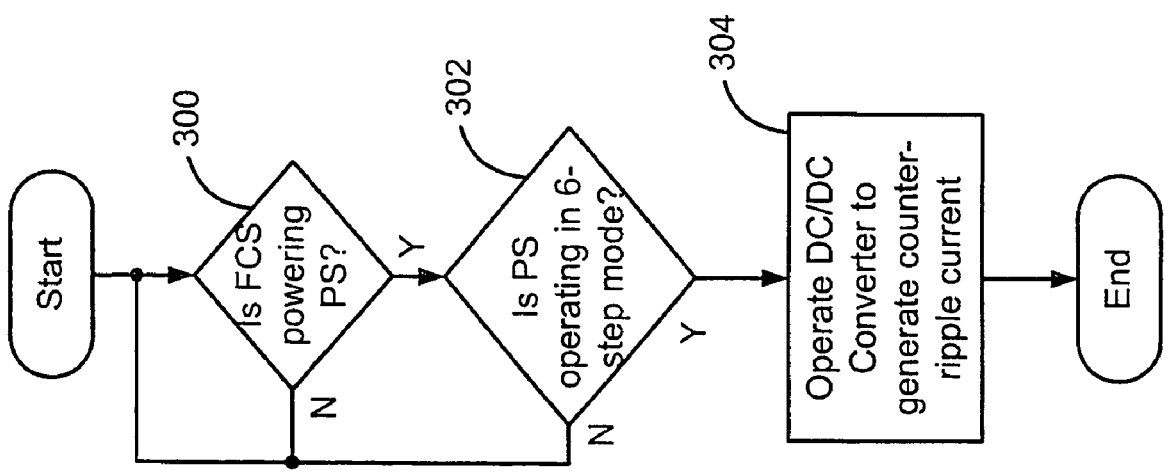

ACTIVE DC BUS FILTER FOR FUEL CELL APPLICATIONS

FIELD OF THE INVENTION

The present invention relates to fuel cell systems, and more particularly to eliminating current ripple in a fuel cell system.

BACKGROUND OF THE INVENTION

Vehicle systems can include a fuel cell stack that generates energy to power a propulsion system and/or auxiliary electrical systems over a voltage bus. The propulsion system includes an electric machine that generates drive torque. Excess energy generated by the fuel cell stack can be stored in an energy storage device (ESD). Energy generated by other means including, but not limited to, regenerative braking can also be stored by the ESD. The ESD can be used to selectively supplement the fuel cell stack to power the propulsion and/or the auxiliary electrical systems. For example, the ESD can be used to power vehicle system components during a start-up period.

During normal operation, power flows from the fuel cell stack to the propulsion system. Under certain operating conditions, the propulsion system operates in six-step mode. In six-step mode, the torque capability of the electric machine is maximized at higher speeds. When operating in the six-step mode, however, a low frequency ripple current is generated in the voltage bus. The ripple current can adversely affect the fuel cell stack.

In order to adequately filter the low frequency ripple current from the voltage bus, a relatively large capacitance is required. In the case of film type bulk capacitors, it is not feasible to produce a sufficiently large capacitor. Although aluminum electrolytic capacitors can be used, they have relatively low current handling capability. Therefore, a significant number of capacitors would be required, which adversely effects overall system cost and size.

SUMMARY OF THE INVENTION

Accordingly, the present invention provides a control system for a vehicle powered by a fuel cell. The control system includes a voltage conversion device that communicates with the fuel cell through a voltage bus and a propulsion system that is selectively powered by the fuel cell through the voltage bus and that selectively generates a ripple current in the voltage bus. The voltage conversion device is regulated to selectively generate a counter-ripple current that reduces the ripple current.

In one feature, the propulsion system generates the ripple current when operating in a six-step mode.

In another feature, the voltage conversion device is regulated to selectively generate the counter-ripple current when the fuel cell powers the propulsion system.

In another feature, the voltage conversion device includes a DC/DC converter.

In another feature, the ripple current is an A/C ripple current.

In another feature, the counter-ripple current is an A/C counter-ripple current.

In still other features, the control system further includes an energy storage device that selectively powers the propulsion system through the voltage bus. The power generated by the fuel cell is selectively stored by the energy storage device.

In yet another feature, the voltage bus is a DC voltage bus.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a flowchart illustrating steps executed by the converter control system of the present invention;

DETAILED DESCRIPTION OF THE PREFERRED EMBODIMENTS

Figure 1:
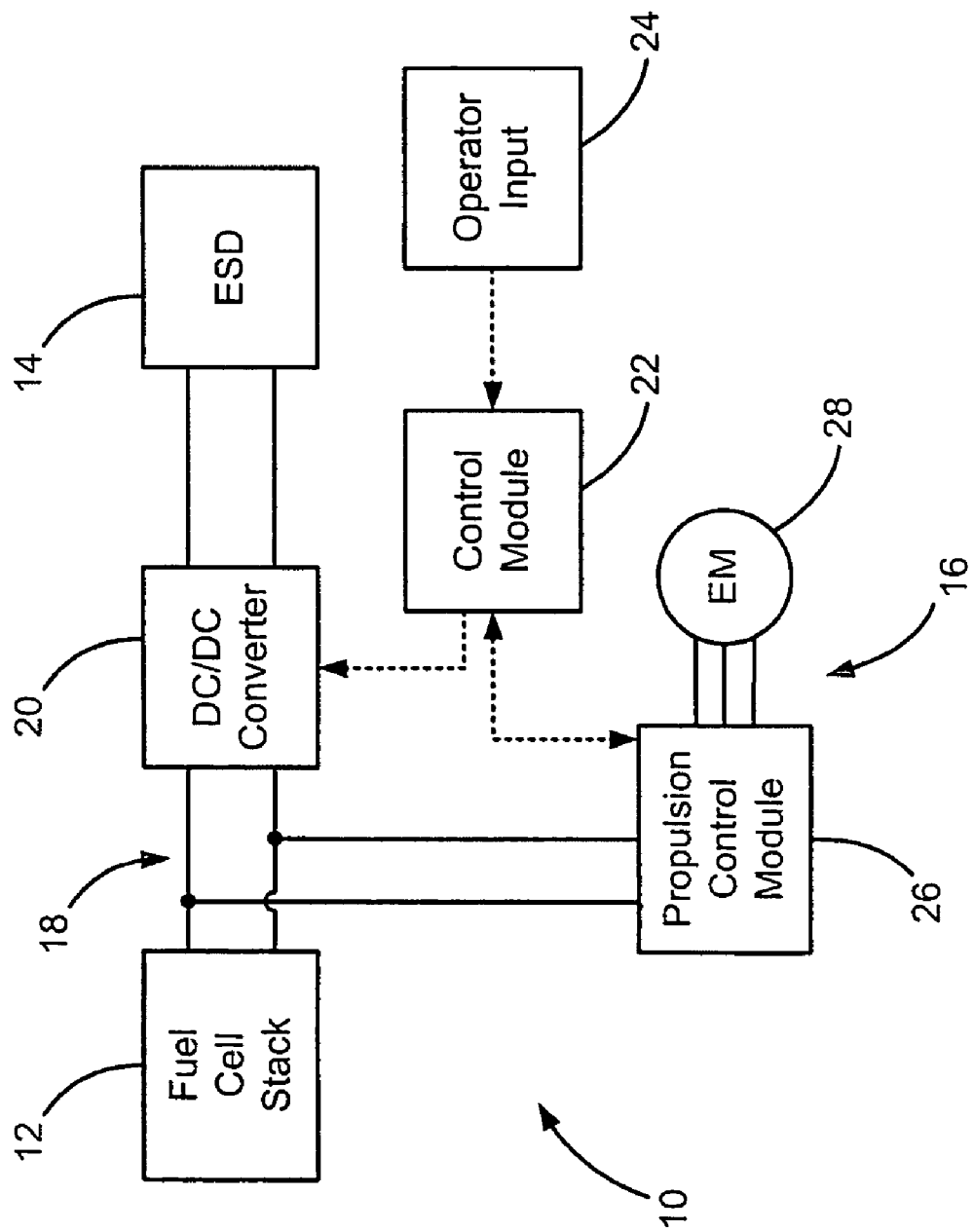
FIG. 1 is a functional block diagram of an exemplary fuel cell system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary vehicle system 10 is illustrated. The vehicle system 10 includes a fuel cell stack 12, an energy storage device (ESD) 14 and a propulsion system 16. The fuel cell stack 12 generates energy by processing anode and cathode reactants (e.g., $H_2$ and $O_2$, respectively). The energy generated by the fuel cell stack 12 is used to power the propulsion system 16. A portion of the energy can be stored in the ESD 14. The energy stored within the ESD 14 can be used to power the propulsion system, supplementing the fuel cell stack 12.

Current is transferred between the components of the vehicle system along a voltage bus 18. More specifically, the voltage bus 18 provides electrical communication between the fuel cell stack 12, the ESD 14 and the propulsion system 16. A DC/DC converter 20 is disposed between the voltage bus 18 and the ESD 14. The DC/DC converter 20 is preferably a bi-directional DC/DC converter that provides an interface between the voltage bus 18 and the ESD 14. In this manner, the ESD 14 can store energy generated by the fuel cell stack 12 and can source energy to drive the propulsion system 16. The DC/DC converter transfers energy between the relatively higher voltage bus (e.g., 255V-425V) and the relatively lower voltage ESD (e.g., 200V-400V).

The vehicle system 10 further includes a control module 22 that regulates operation of the various components described herein. More specifically, the control module 22 regulates operation of the DC/DC converter 20 based on the converter control system of the present invention. The control module 22 generates control signals based on signals generated by an operator input 24 that includes, but is not limited to, an ignition, an accelerator and a brake. For example, in the case of an ignition, the control module 22 controls the DC/DC converter 20 to enable the ESD 14 to power the vehicle system components (e.g., cathode reactant compressor (not shown)) during a start-up period. In the case of a brake, the control module 22 controls the DC/DC converter 20 to enable the ESD 14 to store energy generated during regenerative braking. In the case of an accelerator, the control module 22 controls the propulsion system 16 to drive the vehicle.

The propulsion system 16 includes a propulsion control module 26 and an electric machine 28. The propulsion control module 26 regulates operation of the electric machine 28 based on control signals generated by the control module 22. More specifically, the propulsion control module 26 includes and inverter (not shown) to invert the DC voltage from the voltage bus 18 to an AC voltage, to drive the electric machine 28. The electric machine 28 is an AC electric machine that includes an external stator and an internal rotor. The external stator includes three phase windings. When an AC current is applied to the phase windings, a changing electro-magnetic field is generated and induces rotation of the rotor. The electric machine 28 includes a base speed that is the fastest speed at which the electric machine 28 is designed to operate.

Under certain operating conditions, the electric machine 28 operates in a six-step mode. Six-step mode occurs when the electric machine 28 is rotating at the base speed or above. More specifically, when the electric machine 28 is at base speed or above, the back EMF of the electric machine 28 is relatively high. The DC input voltage is not high enough for the inverter to produce the peak rated phase current. As a result, the inverter output duty cycle, which is a pulse-width modulated (PWM) duty cycle, is at a maximum (i.e., equal to 1) in order to maximize the output of the electric machine 28. Each insulated gate bipolar transistor (IGBT) of the inverter is switched on for 180° of the electrical cycle. When all six IGBTs are switched in this manner, the motor winding voltage waveform (phase to neutral) has six distinct steps per cycle (i.e., six-step mode).

When operating in six-step mode, the normal frequency switching (e.g., 10 kHz) of the insulated gate bipolar transistors (IGBTs) of the inverter ceases and the IGBTs are each switched only once per cycle. For example, if the fundamental frequency of the output current is 200 Hz, each IGBT switches at 200 Hz in the six-step mode. When all of the IGBTs are switched in this manner, the disturbance or ripple current on the voltage bus 18 is at six times the fundamental frequency of the output current, which is a much lower frequency than the normal switching frequency (e.g., 10 kHz) for the inverter. The DC bus capacitor is not effective in filtering out the resultant six-step ripple. However, the six-step mode significantly increases the output power of the electric machine 28. More specifically, the six-step mode maximizes the torque capability of the electric machine 28 at higher speed.

Figure 2:
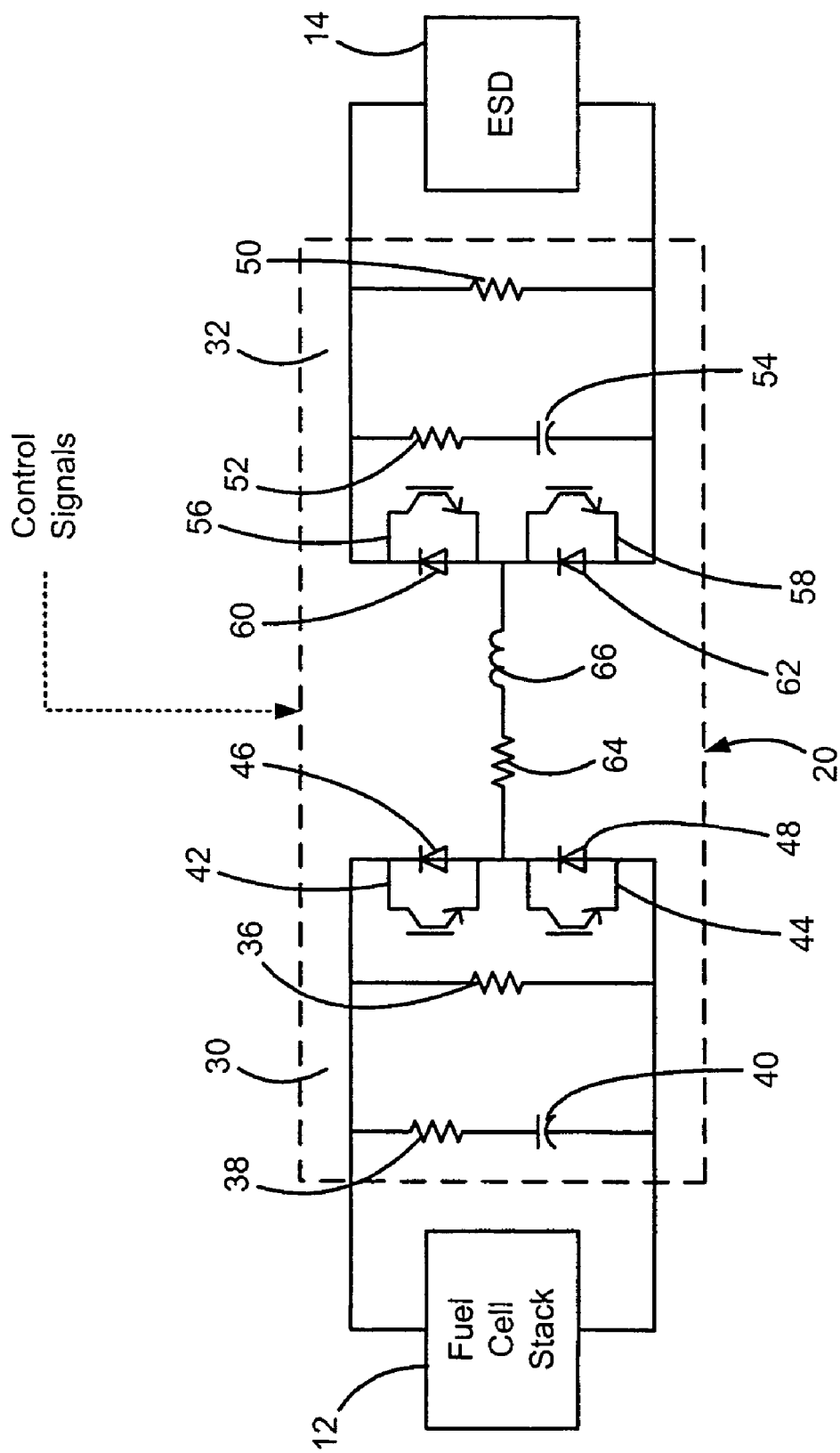
FIG. 2 is a schematic illustration of an exemplary DC/DC converter of the fuel cell system of FIG. 1.

Referring now to FIG. 2, the DC/DC converter 20 will be described in further detail. The DC/DC converter 20 includes a high-voltage side 30 and a low voltage side 32. The high-voltage side 30 is in electrical communication with the fuel cell stack 12 and the low-voltage side 32 is in electrical communication with the ESD 14. The high-voltage side 30 includes resistors, 36,38, a capacitor 40 and a pair of semi-conductor switches 42,44 that each include a diode 46,48, respectively. Similarly, the low-voltage side 32 includes resistors 50,52, a capacitor 54 and a pair of semiconductor switches 56,58 that each include a diode 60,62, respectively. The high-voltage side 30 and the low-voltage side 32 are in electrical communication through a resistor 64 and an inductor 66.

When power flows from the low-voltage side 32 to the high-voltage side 30, the DC/DC converter 20 is operated in a boost/discharge mode to power the high-voltage side load (e.g., the electric machine 28). When power flows from the high-voltage side 30 to the low-voltage side 32, the DC/DC converter 20 is operated in a buck mode to charge the ESD 14. The semi-conductor switches 42,44,56,58 are selectively switched between conducting and non-conducting modes to regulate power transfer across the DC/DC converter 20. More specifically, the converter control system of the present invention selectively switches the semiconductor switches 42,44, 56,58 to generate a counter-ripple current when the electric machine 28 is operated in the six-step mode. The counter-ripple current is preferably an AC current injected onto the voltage bus 18. In this manner, the ripple current generated by operation in the six-step mode is cancelled by the counter-ripple current. The frequency of the counter-ripple current is determined by the control module 22 and is based on vehicle speed. The vehicle speed can be determined from signals provided by the propulsion system 16. The control module 22 generates control signals based on the vehicle speed to generate a desired counter-ripple current.

Referring now to FIG. 3, operation of the converter control system will be described in detail. In step 300, control determines whether the fuel cell stack 12 is powering the propulsion system 16. If the fuel cell stack 12 is not powering the propulsion system 16, control loops back. If the fuel cell stack 12 is powering the propulsion system 16, control determines whether the propulsion system 16 is operating in the six-step mode in step 302. If the propulsion system 16 is not operating in the six-step mode, control loops back to step 300. If the propulsion system 16 is operating in the six-step mode, control operates the DC/DC converter 20 to generate the counter-ripple current on the voltage bus 18 and control ends.

Figure 4A:
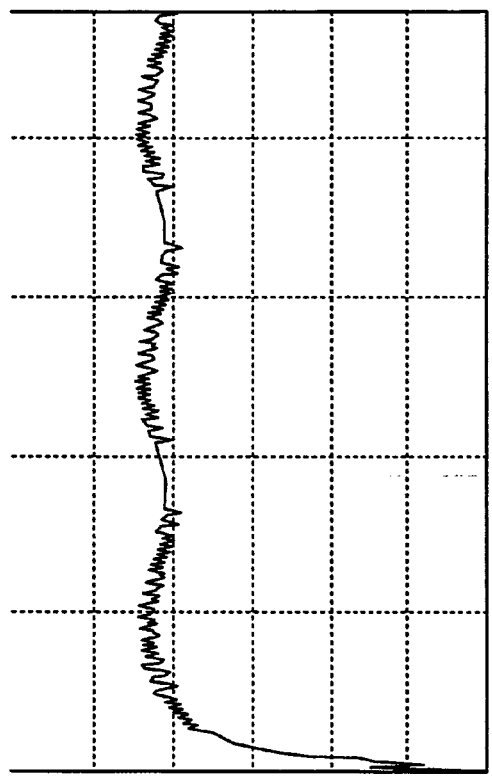
FIG. 4A is a graph illustrating a fuel cell stack current with ripple.
Figure 4B:
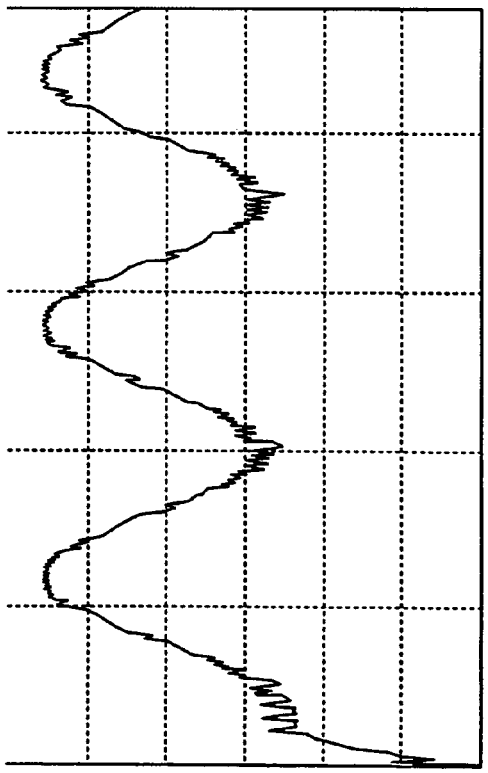
FIG. 4B is a graph illustrating the fuel cell stack current with reduced ripple.
Figure 5A:
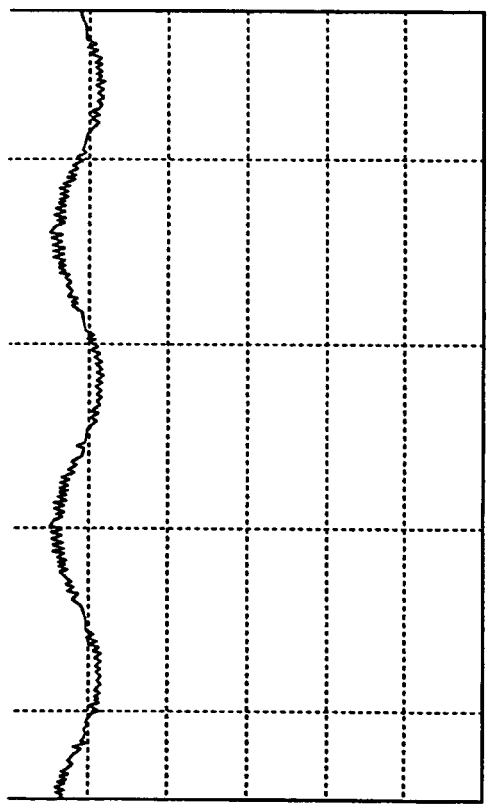
FIG. 5A is a graph illustrating a DC bus voltage with ripple.
Figure 5B:
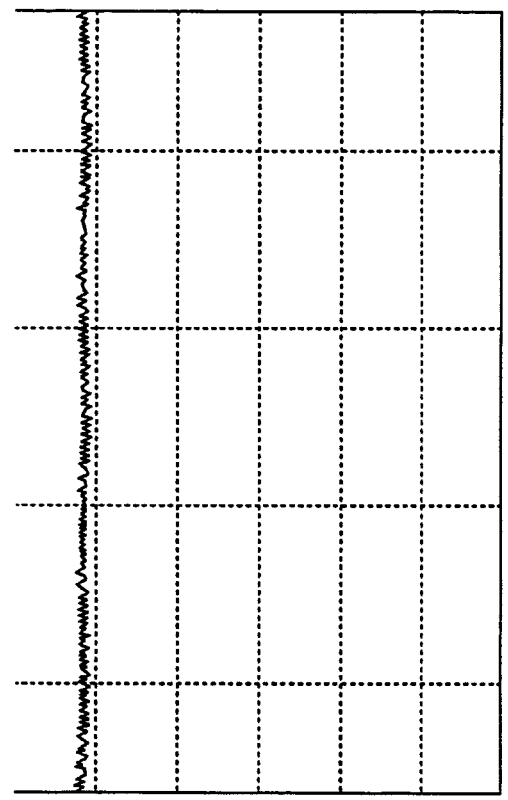
FIG. 5B is a graph illustrating the DC bus voltage with reduced ripple.

Referring now to FIGS. 4A, 4B, 5A and 5B, the advantages of the converter control system of the present invention are illustrated. FIG. 4A illustrates an exemplary fuel cell stack current with ripple current generated in the voltage bus 18 when operating in the six-step mode. More specifically, the fuel cell current of FIG. 4A includes a DC current and the AC ripple current. FIG. 4B illustrates an exemplary fuel cell stack current with low ripple current as a result of the counter-ripple current generated by the DC/DC converter 20, according to the present invention. FIG. 5A illustrates an exemplary DC bus voltage with ripple current generated in the voltage bus 18 when operating in the six-step mode. FIG. 5B illustrates an exemplary DC bus voltage with low ripple current as a result of the counter-ripple current generated by the DC/DC converter 20, according to the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for a vehicle powered by a fuel cell, comprising:

a voltage conversion device that communicates with said fuel cell through a voltage bus;

a propulsion system that is selectively powered by said fuel cell through said voltage bus and that selectively generates a ripple current in said voltage bus, wherein said voltage conversion device is regulated to selectively generate a counter-ripple current that reduces said ripple current.

2. The control system of claim 1 wherein said propulsion system generates said ripple current when operating in a six-step mode.

3. The control system of claim 1 wherein said voltage conversion device is regulated to selectively generate said counter-ripple current when said fuel cell powers said propulsion system.

4. The control system of claim 1 wherein said voltage conversion device includes a DC/DC converter.

5. The control system of claim 1 wherein said ripple current is an A/C ripple current.

6. The control system of claim 1 wherein said counter-ripple current is an A/C counter-ripple current.

7. The control system of claim 1 further comprising an energy storage device that selectively powers said propulsion system through said voltage bus.

8. The control system of claim 7 wherein power generated by said fuel cell is selectively stored by said energy storage device.

9. The control system of claim 1 wherein said voltage bus is a DC voltage bus.

10. A method of reducing a ripple current in a fuel cell system, comprising:
    selectively powering a propulsion system through a voltage bus using said fuel cell;
    selectively operating said propulsion system to generate a ripple current in said voltage bus; and
    regulating a voltage conversion device that communicates with said voltage bus to selectively generate a counter-ripple current that reduces said ripple current.

11. The method of claim 10 wherein said step of operating said propulsion system to generate said ripple current includes operating said propulsion system in a six-step mode.

12. The method of claim 10 wherein said step of regulating said voltage conversion device to selectively generate said counter-ripple current occurs when said fuel cell powers said propulsion system.

13. The method of claim 10 wherein said voltage conversion device includes a DC/DC converter.

14. The method of claim 10 wherein said ripple current is an A/C ripple current.

15. The method of claim 10 wherein said counter-ripple current is an A/C counter-ripple current.

16. The method of claim 10 further comprising selectively powering said propulsion system through said voltage bus using an energy storage device.

17. The method of claim 16 further comprising selectively storing power generated by said fuel cell using said energy storage device.

18. The method of claim 10 wherein said voltage bus is a DC voltage bus.

19. A control system that reduces ripple current in a voltage bus for a vehicle powered by a fuel cell, comprising:
    a voltage conversion device that communicates with said fuel cell through said voltage bus;
    a propulsion system that is selectively operated in a six-step mode and that is selectively powered by said fuel cell through said voltage bus; and
    a control module that regulates said voltage conversion device to selectively generate a counter-ripple current that reduces a ripple current that is generated when operating said propulsion system in said six-step mode.

20. The control system of claim 19 wherein said control module regulates said voltage conversion device to selectively generate said counter-ripple current when said fuel cell powers said propulsion system.

21. The control system of claim 19 wherein said voltage conversion device includes a DC/DC converter.

22. The control system of claim 19 wherein said ripple current is an A/C ripple current.

23. The control system of claim 19 wherein said counter-ripple current is an A/C counter-ripple current.

24. The control system of claim 19 further comprising an energy storage device that selectively powers said propulsion system through said voltage bus.

25. The control system of claim 24 wherein power generated by said fuel cell is selectively stored by said energy storage device.

26. The control system of claim 19 wherein said voltage bus is a DC voltage bus.

\* \* \* \* \*